United States Patent
Horna

(10) Patent No.: US 11,117,469 B2
(45) Date of Patent: Sep. 14, 2021

(54) SINGLE-TRACK VEHICLE COMPRISING A DISPLAY DEVICE

(71) Applicant: Bayerische Motoren Werke Aktiengesellschaft, Munich (DE)

(72) Inventor: Guenter Horna, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 280 days.

(21) Appl. No.: 16/406,226

(22) Filed: May 8, 2019

(65) Prior Publication Data

US 2019/0263264 A1 Aug. 29, 2019

Related U.S. Application Data

(63) Continuation of application No. PCT/EP2018/050488, filed on Jan. 10, 2018.

(30) Foreign Application Priority Data

Jan. 19, 2017 (DE) ..................... 10 2017 200 854.7

(51) Int. Cl.
*B60K 35/00* (2006.01)
*G09G 1/00* (2006.01)
(Continued)

(52) U.S. Cl.
CPC .......... *B60K 35/00* (2013.01); *G06F 3/04886* (2013.01); *G09G 1/007* (2013.01);
(Continued)

(58) Field of Classification Search
None
See application file for complete search history.

(56) References Cited

U.S. PATENT DOCUMENTS 5,629,668 A * 5/1997 Downs ................ G01C 22/002
340/427
6,396,394 B1 5/2002 Suzuki et al.
(Continued)

FOREIGN PATENT DOCUMENTS

| DE | 100 13 930 A1 | 11/2000 |
| EP | 2 868 512 A1 | 5/2015 |
| WO | WO 2014/134148 A2 | 9/2014 |

OTHER PUBLICATIONS

International Search Report (PCT/ISA/210) issued in PCT Application No. PCT/EP2018/050488 dated May 2, 2018 with English translation (four (4) pages).
(Continued)

*Primary Examiner* — Chico A Foxx
(74) *Attorney, Agent, or Firm* — Crowell & Moring LLP

(57) ABSTRACT

A single-track vehicle is provided with a display device and a control device which is configured coupled to the display device such that at least one first display layout and one second display layout are presentable in the display device. The first and the second display layout have at least one main display field. Upon switching to the first display layout, the current speed and/or the current engine speed and/or the current gear stage and/or a current desired speed of the single-track vehicle are/is displayed in the region of the main display field, and, upon switching to the second display layout, a plurality of menu points of a selection menu and/or items of information about comfort functions of the single-track vehicle are depicted in the region of the main display field.

14 Claims, 2 Drawing Sheets

(51) Int. Cl.
*G06F 3/0488* (2013.01)
*G09G 5/14* (2006.01)
*G09G 5/00* (2006.01)
*B62J 50/20* (2020.01)

(52) U.S. Cl.
CPC ............ *G09G 5/14* (2013.01); *B60K 2370/11* (2019.05); *B60K 2370/155* (2019.05); *B60K 2370/1529* (2019.05); *B60K 2370/16* (2019.05); *B60K 2370/167* (2019.05); *B60K 2370/182* (2019.05); *B60K 2370/186* (2019.05); *B60K 2370/52* (2019.05); *B60Y 2200/12* (2013.01); *B62J 50/20* (2020.02); *G06F 2203/04803* (2013.01); *G09G 5/00* (2013.01); *G09G 2340/10* (2013.01); *G09G 2340/12* (2013.01); *G09G 2340/14* (2013.01); *G09G 2380/10* (2013.01)

(56) References Cited

U.S. PATENT DOCUMENTS

| | | | | |
|---|---|---|---|---|
| 7,826,934 | B1* | 11/2010 | Schowalter | B60N 2/78 701/1 |
| 8,121,757 | B2* | 2/2012 | Song | B62K 25/04 701/37 |
| 9,452,678 | B1* | 9/2016 | Boss | G06F 3/0482 |
| 10,528,233 | B2* | 1/2020 | Spitz | A01D 34/006 |
| 10,632,994 | B2* | 4/2020 | Inoguchi | B60W 50/085 |
| 2005/0267674 | A1* | 12/2005 | Suzuki | B62K 11/14 701/444 |
| 2009/0248419 | A1* | 10/2009 | Spaulding | G10L 15/22 704/275 |
| 2013/0054118 | A1* | 2/2013 | Nagumo | F02D 41/3005 701/104 |
| 2013/0144464 | A1 | 6/2013 | Dorogusker et al. | |
| 2013/0144482 | A1* | 6/2013 | Tuukkanen | B60R 1/00 701/29.6 |
| 2013/0145297 | A1* | 6/2013 | Ricci | G08G 1/017 715/765 |
| 2013/0158792 | A1* | 6/2013 | Kobayashi | G06F 17/00 701/36 |
| 2013/0239732 | A1* | 9/2013 | Gordh | B60K 37/06 74/484 R |
| 2013/0261860 | A1* | 10/2013 | Oyama | G01C 21/3469 701/22 |
| 2013/0293364 | A1 | 11/2013 | Ricci et al. | |
| 2014/0032042 | A1* | 1/2014 | Taniguchi | B60K 35/00 701/36 |
| 2014/0109080 | A1* | 4/2014 | Ricci | G06F 3/04886 717/174 |
| 2014/0125475 | A1* | 5/2014 | Yasuhara | B60K 35/00 340/441 |
| 2014/0253419 | A1* | 9/2014 | Tanada | G09G 3/20 345/55 |
| 2015/0185545 | A1* | 7/2015 | Tetsuka | B62K 11/04 180/90 |
| 2015/0363087 | A1 | 12/2015 | Lee | |
| 2016/0311370 | A1* | 10/2016 | Oyanagi | G01D 13/265 |
| 2017/0008398 | A1* | 1/2017 | Kaneko | B60K 35/00 |
| 2017/0282744 | A1* | 10/2017 | Koo | B60W 20/13 |
| 2017/0334500 | A1* | 11/2017 | Jarek | G06F 3/16 |
| 2018/0170277 | A1* | 6/2018 | Yamamoto | B62K 11/00 |
| 2018/0354367 | A1* | 12/2018 | Mertens | B60K 35/00 |
| 2019/0056745 | A1* | 2/2019 | Meehan | B62J 45/40 |
| 2019/0061461 | A1* | 2/2019 | Hengstenberg | B60H 1/00028 |
| 2019/0210683 | A1* | 7/2019 | Lin | G06F 3/048 |
| 2019/0220179 | A1* | 7/2019 | Della Vecchia | B60R 13/0256 |

OTHER PUBLICATIONS

German-language Written Opinion (PCT/ISA/237) issued in PCT Application No. PCT/EP2018/054088 dated May 2, 2018 (six (6) pages).

German-language Search Report issued in counterpart German Application No. 10 2017 200 854.7 dated Nov. 21, 2017 with partial English translation (11 pages).

* cited by examiner

SINGLE-TRACK VEHICLE COMPRISING A DISPLAY DEVICE

CROSS REFERENCE TO RELATED APPLICATIONS

This application is a continuation of PCT International Application No. PCT/EP2018/050488, filed Jan. 10, 2018, which claims priority under 35 U.S.C. § 119 from German Patent Application No. 10 2017 200 854.7, filed Jan. 19, 2017, the entire disclosures of which are herein expressly incorporated by reference.

BACKGROUND AND SUMMARY OF THE INVENTION

The invention relates to a single-track vehicle, in particular a motorcycle, having a display device.

The current development of single-track vehicles focuses on improving the driver/single-track vehicle interface. A particular challenge in this case is that of making the continuously increasing multiplicity of functions of the single-track vehicle operable in a safe and convenient manner for a driver of the single-track vehicle. Adopting concepts from the automotive sector is not expedient in this case since the installation space available in an automobile for large or multiple display devices or operating devices is not available in a single-track vehicle.

The invention is based on the object of specifying a single-track vehicle which is improved in comparison with the prior art.

The invention is based on the concept of repeatedly using the display area available in a single-track vehicle for displaying information in a particularly effective manner in order to effectively convey the necessary or particularly useful information to a driver depending on the driving situation.

A preferred single-track vehicle has a display device, for example a graphics display or a freely programmable instrument combination instrument, and a control device, for example a processor device. The display device makes it possible to present information in a display field implemented by the display device.

The control device is set up, in terms of hardware and/or software, and is coupled to the display device in such a manner that at least a first display layout and a second display layout can be implemented, in particular selectively or alternatively, by the display device, wherein the first display layout and the second display layout have at least one main display field.

In the case of automatically or manually triggered switching to the first display layout, the current speed and/or the current engine speed and/or the current gear stage and/or a current desired speed of the single-track vehicle is/are displayed in the region of the main display field.

In the case of automatically or manually triggered switching to the second display layout, a plurality of menu items of a selection menu and/or information relating to comfort functions of the single-track vehicle is/are presented in the region of the main display field. A process of switching to a display layout also comprises a presentation of information in the display field of the display device according to the display layout, which presentation is caused by the control device.

The main display field is preferably of the same size when implementing the first display layout and the second display layout. The main display field preferably occupies more than 50%, more than 60%, more than 70% or more than 80% of the display area of the entire display field. The main display field preferably occupies the center or the middle of the display field.

As a result of the invention, the limited installation space available for a display device in a single-track vehicle is efficiently used by using a main display field to display different information depending on the driving or operating situation. In particular, as a result of the fact that the main display field is occasionally used to present menu items of a selection menu, the operation of the single-track vehicle, in particular the operation of a selection menu, can be considerably improved.

What information is presented in what situation in the main display field according to the invention is the result of comprehensive simulations and usability tests on which the invention is based. The aim of these simulations and usability tests was to display the necessary or useful information to a driver of a single-track vehicle at the suitable place expected by the driver in any situation in such a manner that the driver can operate the single-track vehicle and its functions in a safe and convenient manner without being distracted too greatly from his actual driving task.

One development of the invention is that the first display layout and the second display layout have at least one first secondary display field which is respectively beside, in particular below, the main display field.

At least partially identical information, in particular status information relating to comfort functions of the single-track vehicle, is preferably presented in the first secondary display field in a presentation according to the first display layout and the second display layout, in particular at an identical position. The status information relating to comfort functions preferably comprises the outside temperature and/or the status of the handle heating and/or the status of the seat heating and/or the connection status of a communication device and/or the reception strength of a communication device and/or status information relating to a lighting device of the single-track vehicle.

One development of the invention is that the first display layout and the second display layout have at least one second secondary display field which is respectively beside, in particular above, the main display field.

At least partially or exclusively identical information, in particular range-based information relating to the single-track vehicle, is preferably presented in the second secondary display field in the first display layout and in the second display layout, in particular at an identical position. The range-based information relating to the single-track vehicle preferably comprises the tank level and/or the predicted remaining range.

One development of the invention is that the first display layout and the second display layout have at least one third secondary display field which is respectively beside, in particular above, the main display field.

Upon switching to the second display layout, the current speed and/or the current engine speed and/or the current gear stage and/or a current desired speed of the single-track vehicle is/are preferably displayed in the region of the third secondary display field, and, upon switching to the first display layout, the region of the third secondary display field is used as an extended region of the main display field, in particular for the purpose of completing a graphical presentation in the main display field.

One development of the invention provides an operating device which interacts with the control device in such a manner that, in response to an output signal from the operating device, there is a changeover from the first display layout to the second display layout (there is a changeover from an information presentation according to the first display layout to an information presentation according to the second display layout) and vice versa, for example triggered by a user calling a selection menu using the operating device.

Another development of the invention provides a capture device which interacts with the control device in such a manner that, in response to an output signal from the capture device, there is a changeover from the first display layout to the second display layout and vice versa, for example triggered by exceeding of a predefined speed value or a predefined acceleration value. A measuring device (speed measuring device, acceleration measuring device), a location determination device (capture of a current location) of a navigation system or a receiving device of a communication module (capture of an incoming call) can be used as the capture device, for example.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
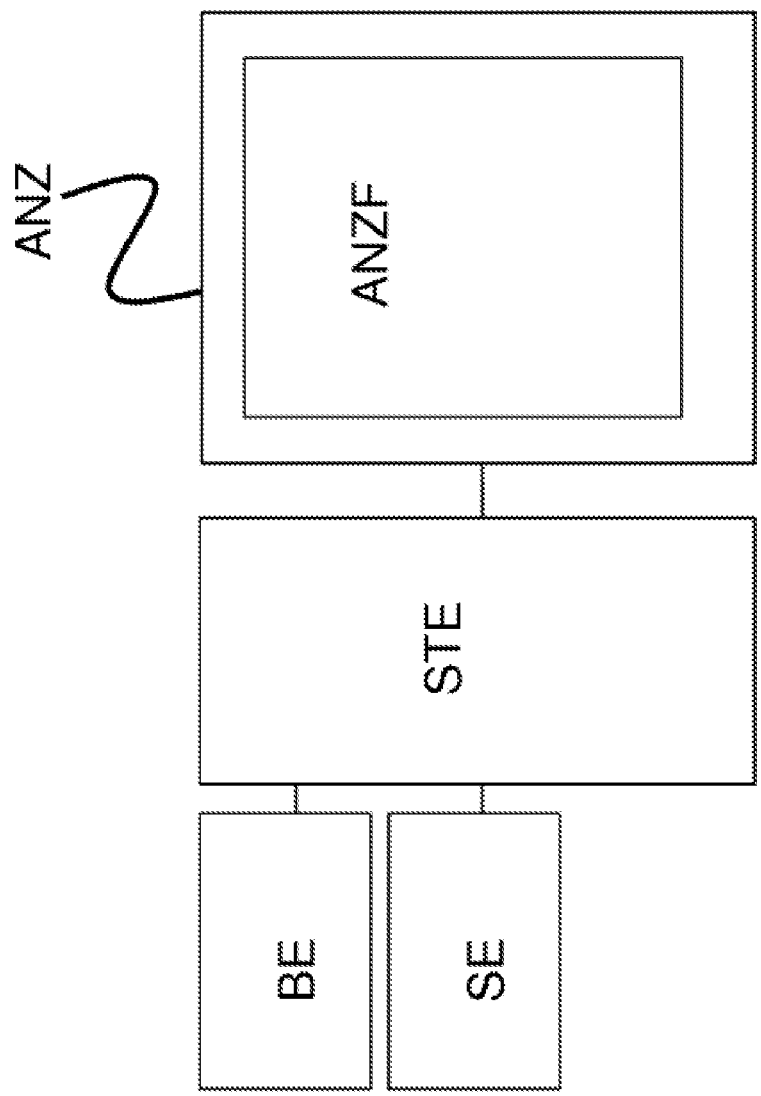
FIG. 1 shows part of a simplified basic block diagram of a single-track vehicle in accordance with an embodiment of the present invention.

FIG. 1 shows the following components or assemblies of a single-track vehicle, for example a motorcycle, which are relevant to the explanation of the invention:
- a display device ANZ such as a freely programmable graphics display;
- an operating device BE such as one or more pushbuttons, push controllers, switches or rotary controllers;
- a capture device SE such as a speed sensor or an acceleration sensor;
- a control device STE such as a processor device which can comprise one or more control units, for example a main control unit and/or a graphics control unit, and is set up, in terms of programming, and is coupled to the display device ANZ, to the operating device BE and to the capture device SE in such a manner that the currently required or useful information for the driver is displayed in a display field ANZF of the display device ANZ depending on the driving or operating situation.

Figure 2:
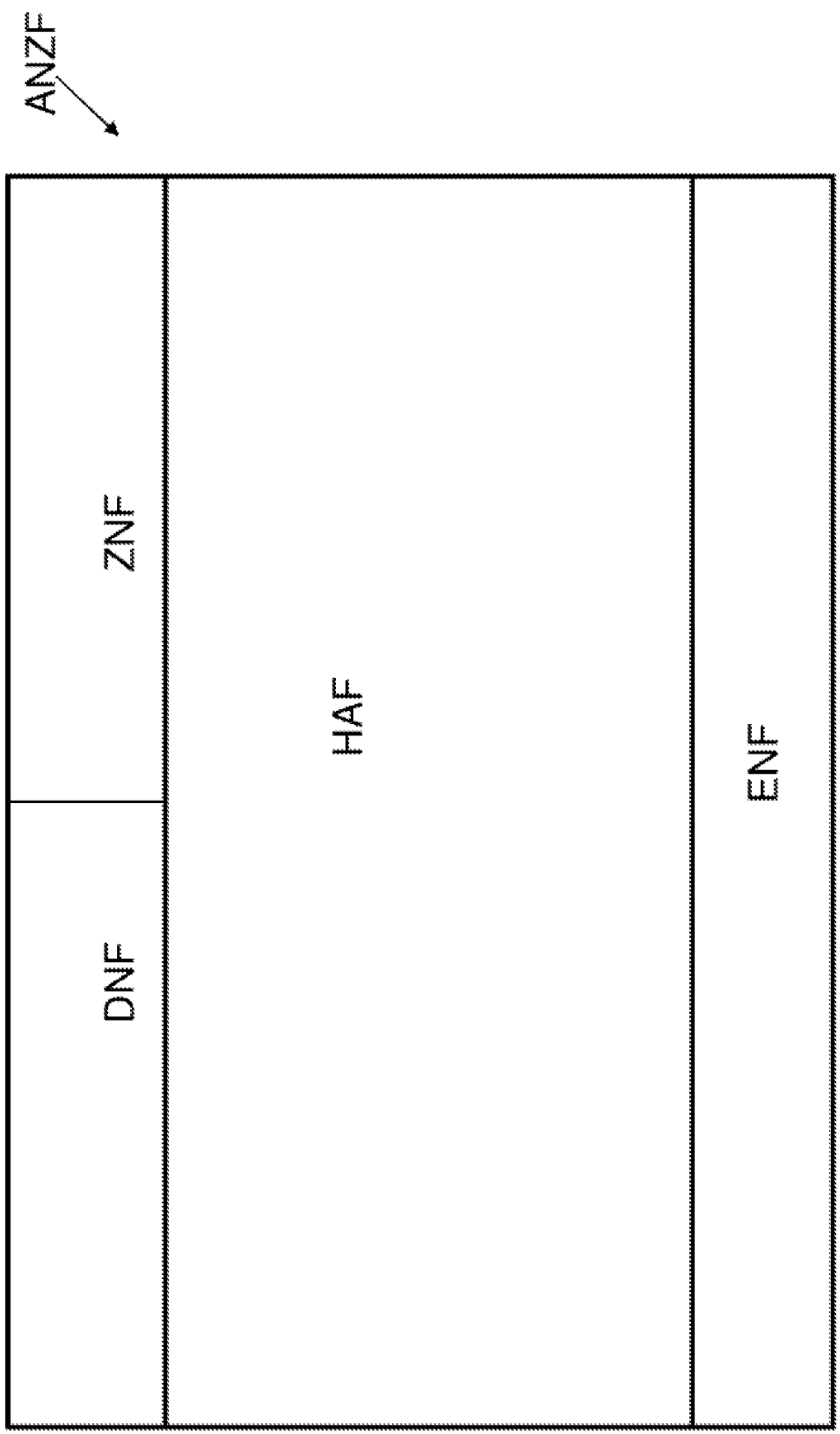
FIG. 2 shows a simplified basic illustration of a display field in accordance with an embodiment of the present invention.

FIG. 2 shows a basic division of a display field ANZF implemented by means of the display device ANZ into:
- a main display field HAF which occupies the center of the display field ANZF and occupies more than 50% of the area of the display field;
- a first secondary display field ENF which is arranged below the main display field HAF from the point of view of the driver;
- a second secondary display field ZNF which is arranged above the main display field HAF from the point of view of the driver; and
- a third secondary display field DNF which is arranged above the main display field HAF and laterally beside the second secondary display field ZNF from the point of view of the driver.

The display device ANZ can be switched, using the control device STE, into at least two different display layouts in which different information to be displayed can be applied to said display fields.

In a first display layout ("driving scenario"), driving-relevant contents are in the foreground. For this purpose, information such as the current speed and/or the current engine speed and/or the current gear stage and/or a current desired speed of the single-track vehicle is presented in the main display field HAF.

In the second display layout ("menu operation scenario"), operation-relevant contents are in the foreground. For this purpose, a plurality of menu items of a selection menu, for example in the form of selection tiles, and/or information relating to comfort functions of the single-track vehicle is/are presented in the region of the main display field HAF. In this display layout, information such as the current speed and/or the current engine speed and/or the current gear stage and/or a current desired speed of the single-track vehicle is presented in the third secondary display field DNF, wherein the font size for the current speed is smaller than the font size for presenting the current speed in the first display layout, for example.

The transition from the first display layout to the second display layout is effected in an animated manner in such a way that, for example, the presentation of the current speed is moved virtually continuously from the main display field HAF to the third secondary display field DNF.

Upon switching of the third secondary display field DNF to the first display layout, the secondary display field DNF is used as an extended region of the main display field HAF, in particular for the purpose of completing a graphics presentation in the main display field HAF with respect to the current engine speed.

In both display layouts, at least partially identical information, in particular range-based information relating to the single-track vehicle, is presented in the second secondary display field ZNF, in particular at an identical position, for example information relating to the tank level and the remaining range.

In both display layouts, at least partially identical information, in particular status information relating to comfort functions of the single-track vehicle, is presented in the first secondary display field ENF, in particular at an identical position, for example the outside temperature and/or the status of the handle heating and/or the status of the seat heating and/or the connection status of a communication device and/or the reception strength of a communication device and/or status information relating to a lighting device.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A single-track vehicle, comprising:
a display device configured to display at least a first display layout and a second display layout; and a control device coupled to the display device and configured to control display of the first display layout and the second display layout, wherein the first display layout and the second display layout each have a respective main display field, the first display layout is configured to display one or more of a current vehicle speed, a current engine speed, a current gear stage, and a current desired speed of the single-track vehicle in the first display layout main display field, the second display layout is configured to display one or both of a plurality of menu items of a selection menu and information relating to comfort functions of the single-track vehicle in the second display layout main display field, the first display layout and the second display layout each have at least one first secondary display field adjacent to their respective main display fields, at least partially identical first information is presented in the first secondary display field in the first display layout and in the first secondary display field in the second display layout, and the at least partially identical first information is status information relating to comfort functions of the single-track vehicle, the status information including at least one of handle heating status, seat heating status, communication device connection status, communication device reception strength status, and lighting device status.

2. The single-track vehicle as claimed in claim 1, wherein the respective first secondary display fields are below their respective main display fields.

3. The single-track vehicle as claimed in claim 1, wherein the at least partially identical first information is presented at an identical position in the respective first secondary display fields.

4. The single-track vehicle as claimed in claim 1, wherein the first display layout and the second display layout each have at least one second secondary display field adjacent to their respective main display fields.

5. The single-track vehicle as claimed in claim 4, wherein the respective second secondary display fields are above their respective main display fields.

6. The single-track vehicle as claimed in claim 4, wherein at least partially identical second information is presented in the second secondary display field in the first display layout and in the second secondary display field in the second display layout.

7. The single-track vehicle as claimed in claim 6, wherein the at least partially identical second information is range-based information relating to the single-track vehicle.

8. The single-track vehicle as claimed in claim 6, wherein the at least partially identical second information is presented at an identical position in the respective second secondary display fields.

9. The single-track vehicle as claimed in claim 4, wherein the first display layout and the second display layout each have at least one third secondary display field adjacent to their respective main display fields.

10. The single-track vehicle as claimed in claim 9, wherein the respective third secondary display fields are above their respective main display fields.

11. The single-track vehicle as claimed in claim 1, further comprising:

an operating device configured to interacts with the control device such that, in response to an output signal from the operating device, the first display layout is changed to the second display layout.

12. The single-track vehicle as claimed in claim 11, further comprising:

a capture device configured to interact with the control device such that, in response to an output signal from the capture device, the first display layout is changed to the second display layout.

13. The single-track vehicle as claimed in claim 1, further comprising:

a capture device configured to interact with the control device such that, in response to an output signal from the capture device, the first display layout is changed to the second display layout.

14. A single-track vehicle, comprising:

a display device configured to display at least a first display layout and a second display layout; and a control device coupled to the display device and configured to control display of the first display layout and the second display layout, wherein the first display layout and the second display layout each have a respective main display field, the first display layout and the second display layout each have at least one first secondary display field adjacent to their respective main display fields, the first display layout is configured to display one or more of a current vehicle speed, a current engine speed, a current gear stage, and a current desired speed of the single-track vehicle in the first display layout main display field, the second display layout is configured to display one or both of a plurality of menu items of a selection menu and information relating to comfort functions of the single-track vehicle in the second display layout main display field, the first display layout and the second display layout each have at least one second secondary display field adjacent to their respective main display fields, the first display layout and the second display layout each have at least one third secondary display field adjacent to their respective main display fields, upon switching to the second display layout, one or more of the current vehicle speed, the current engine speed, the current gear stage, and the current desired speed of the single-track vehicle are displayed in the region of the third secondary display field of the second display layout, and upon switching to the first display layout, the region of the third secondary display of the first display layout field is used as an extended region of the main display field of the first display layout field.

* * * * *